US005369467A

United States Patent [19]

Monroe

[11] Patent Number: 5,369,467

[45] Date of Patent: Nov. 29, 1994

[54] METHOD FOR MAKING SPORTSCARDS

[76] Inventor: Kenneth H. Monroe, 32758 Birchwood, Westland, Mich. 48185

[21] Appl. No.: 133,884

[22] Filed: Oct. 12, 1993

[51] Int. Cl.[5] .................... G03B 27/32; G03B 27/44; G03B 27/52

[52] U.S. Cl. .................... 355/77; 354/109; 355/40; 355/54

[58] Field of Search .............. 354/105, 109, 107, 108; 229/92.8; 273/298; 283/117; 355/54, 77, 75, 40, 86, 28, 29, 32, 35

[56] References Cited

U.S. PATENT DOCUMENTS

| | | | |
|---|---|---|---|
| 3,635,558 | 1/1972 | Le Peer et al. | 355/72 X |
| 4,325,632 | 4/1982 | Tsuji et al. | 355/86 |
| 4,382,676 | 5/1983 | Ohta et al. | 355/75 |
| 4,468,116 | 8/1984 | Miyasaka | 355/54 |
| 4,866,476 | 9/1989 | Kogane et al. | 355/40 |
| 4,890,402 | 1/1990 | Carroll | 40/159 |
| 4,908,657 | 3/1990 | Kogane | 355/75 |
| 4,918,483 | 4/1990 | Otake | 355/40 |
| 4,959,683 | 9/1990 | Otake et al. | 355/28 |
| 4,977,061 | 12/1990 | Suganuma | 430/203 |
| 5,072,253 | 12/1991 | Patton | 355/40 |

*Primary Examiner*—Richard A. Wintercorn
*Attorney, Agent, or Firm*—Charles W. Chandler

[57] ABSTRACT

A method for making a plurality of colored sportcards comprising the steps of forming a master panel with a matrix of borders, each associated with a window area; cutting each window area into a border opening; pasting a photograph behind each window opening; making a colored photocopy of the master panel and the colored photographs; pasting a back panel on the rear of the photocopied panel having indicia related to each of the images within the photocopied window openings; and then cutting the photocopied panel and the back panel to as many sub panels as there are photocopied windows to form a plurality of sportscards. The process is repeated so that each individual photograph is made into as many sportscards as desired.

3 Claims, 3 Drawing Sheets

METHOD FOR MAKING SPORTSCARDS

BACKGROUND OF THE INVENTION

Sportscards are commonly made for popular athletes, such as baseball players and the like. They are usually about $2\frac{1}{2}$ inches wide and $3\frac{1}{2}$ inches tall, printed on a relatively stiff cardstock. Commercially available sportscards made for professional athletes are relatively inexpensive because they are printed in substantial volumes, but using relatively expensive printing methods.

There is a market for sportscards for amateur athletes. Conventional sportscard printing methods are not suitable for such a market because of the low volume. For example, an amateur athlete may only need 10–20 cards.

SUMMARY OF THE INVENTION

The broad purpose of the present invention is to provide an inexpensive method for making low volume sportscards. A master panel is printed with a matrix of borders, each outlining a window area, using a computer and printer apparatus. An opening is cut in each window area. A photograph of an athlete, is pasted behind each window. A color photocopy is made of the master panel and the photographs. A back panel is pasted on the rear of the photocopy. The back panel has information related to each of the photocopied images within the window areas. The photocopied panel and the rear panel are then cut into as many sub panels as there are windows to form a plurality of sportscards. The process is repeated until each athlete's photograph has been made into as many sportscards as desired.

The process can be used for making cards for individuals or events other than athletes.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views.

DESCRIPTION OF THE PREFERRED EMBODIMENT

Figure 1:
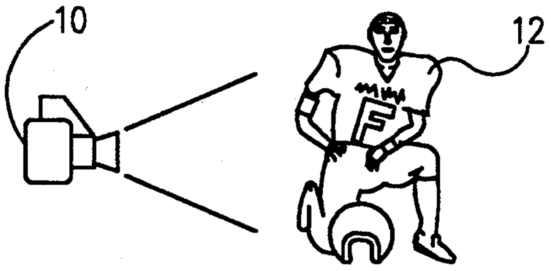
FIG. 1 illustrates an amateur athlete being photographed to provide a color photograph.
Figure 2:
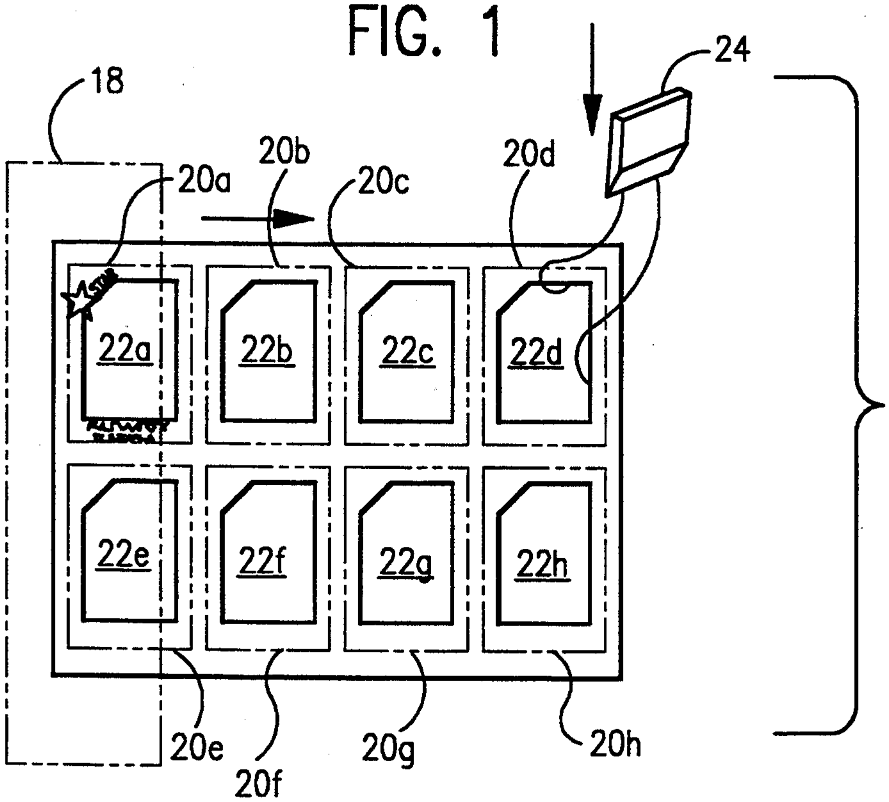
FIG. 2 illustrates a master panel having its front side printed with borders for eight window areas, and then having each window area die cut to form a window opening.

The inventive method comprises a technique for making either one or several sportscards of athletes and then repeating the process as many times as necessary to provide a sufficient number of cards for each individual athlete. Referring to FIG. 1, the first step comprises employing a camera 10 for taking the color photograph of an athlete 12. For illustrative purposes, eight individual athletes are photographed to make eight color photographs *14a*, *14b*, *14c*, *14d*, *14e*, *14f*, *14g*, *14h*. Each color photograph is preferably $2\frac{1}{2}$ inches wide and 3 5/16 inches tall.

With a supply of photographs on hand, the user then prepares a master panel 16 which, for example, may be a paper sheet used in color computer printers. A computer laser printer 18 is preferred. A computer program, such as "Pagemaker", is employed in the appropriate computer apparatus so that laser printer 18 prints eight individualized borders *20a*, *20b*, *20c*, *20d*, *20e*, *20f*, *20g*, *20h*, in a matrix on the panel. The borders may be identical or individualized.

Figure 3:
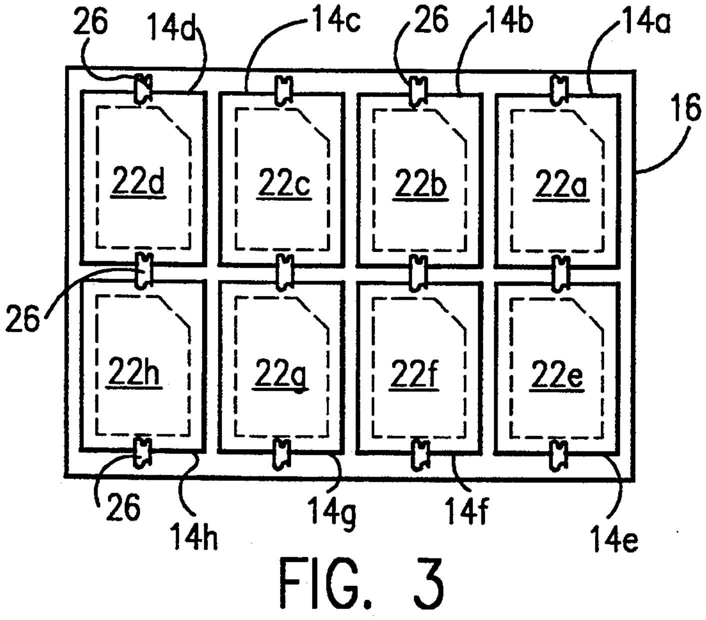
FIG. 3 is a view of the rear side of the master panel with photographs taped over each window opening.

Each border includes indicia identifying the particular athlete whose photograph is being used within the border. The eight borders circumscribe eight generally rectangular window areas *22a*, *22b*, *22c*, *22d*, *22e*, *22f*, *22g*, *22h*. Each window area is less than the area of it's corresponding photograph. Each window has a height of $2\frac{5}{8}$ inches and a width of $\frac{7}{8}$ inches. Die cutting means 24 are then employed for cutting a window opening in each window area. Each window area thus becomes a window opening having an area less than that of it's corresponding photograph. The eight photographs are then located behind the master panel so that photograph *14a* is behind window opening *22a*, photograph *14b* is behind window opening *22b*, and so forth. Each photograph is located behind it's respective window opening to best illustrate the image contained in the photograph. It can be seen in FIG. 3 that the edge of each photograph overlaps the edge of it's corresponding window opening.

Tape means 26 are then employed for attaching each of the photographs in it's location behind it's respective window opening so that the colored image of the photograph is visible through the corresponding opening.

Figure 4:
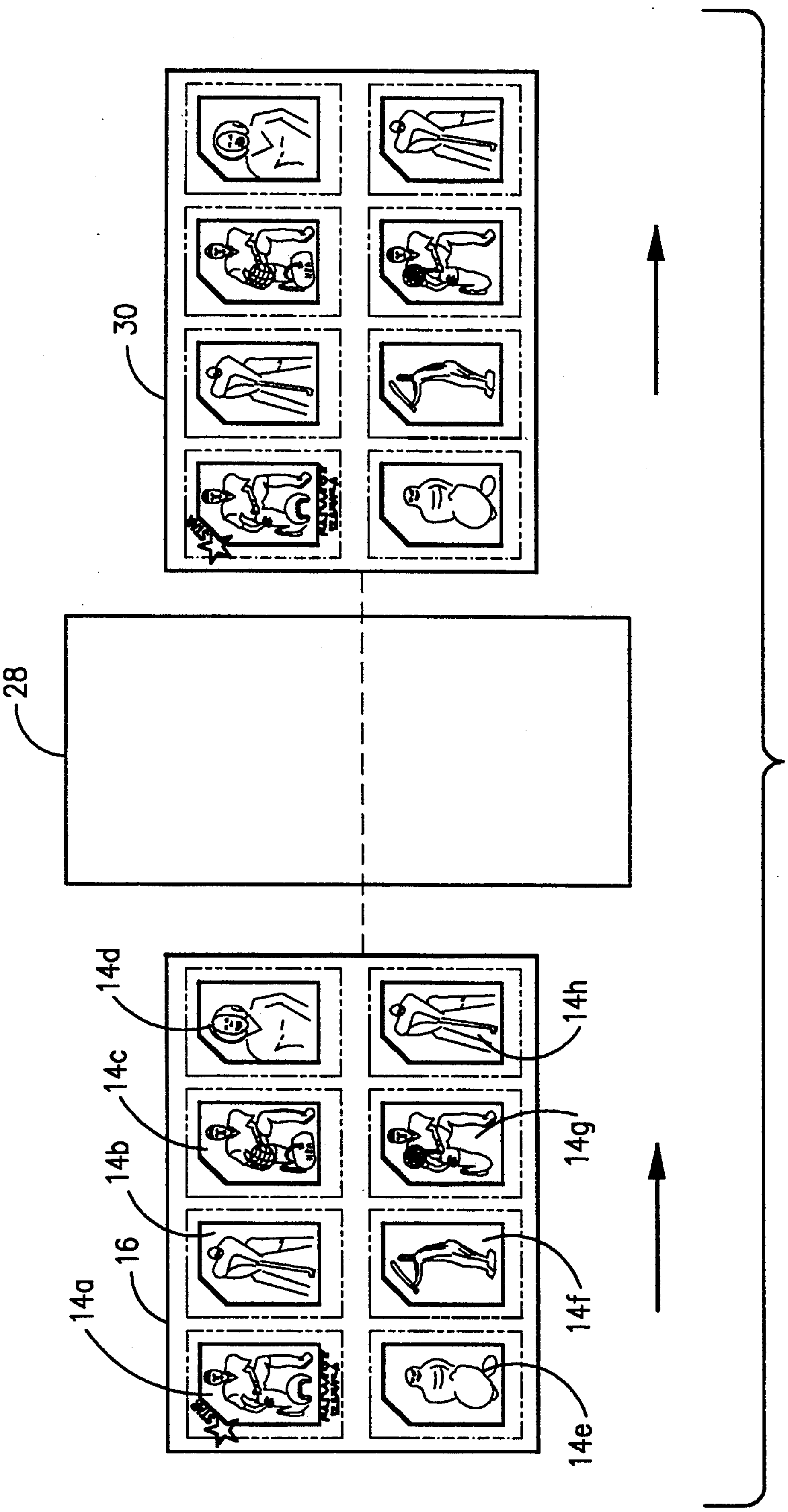
FIG. 4 illustrates the master panel being passed through photocopy apparatus to produce a photocopy of the front face of the master panel.

Referring to FIG. 4, master panel 16 and the eight attached photographs are processed through a color photocopy apparatus 28 to provide a photocopied panel 30 which is a single layer panel having the eight photographs in a photocopied form.

Figure 5:
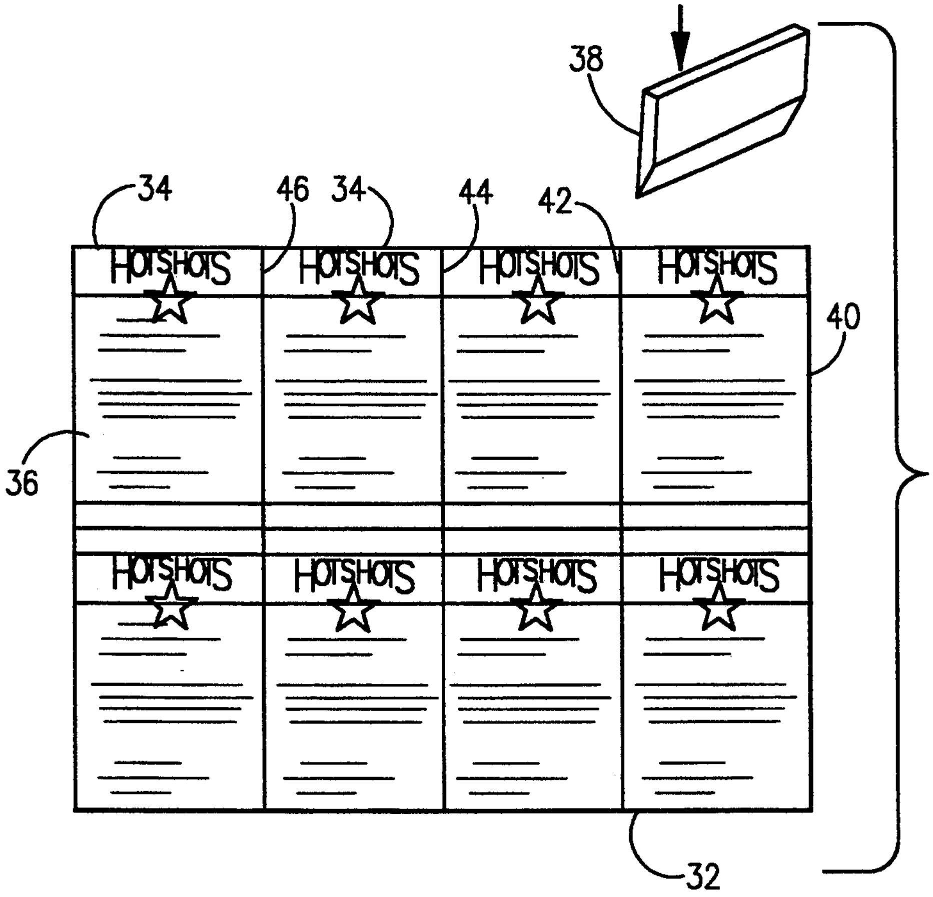
FIG. 5 is a view of the rear panel attached to the front panel, and the two panels being die cut into eight sub panels.

Referring to FIG. 5, a rear panel 32 is printed on a computer. The rear panel may be of a suitable, relatively stiff cardstock and is printed with indicia material 34 that is common to each of the eight cards, such as the trademark "Hotshots", and individual indicia such as at 36 which is unique to the particular card with which it is associated. The rear panel is then adhered through the use of a suitable adhesive to the rear face of photocopy panel 30 so that each of the rear sub panels, such as 36, is behind it's associated photocopied photograph.

Figure 6:
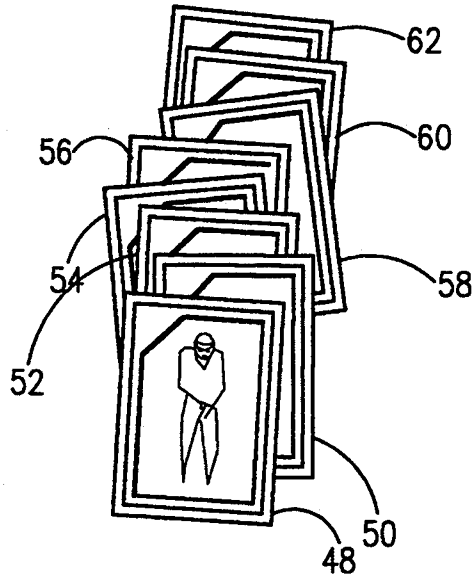
FIG. 6 illustrates the eight finished sportscards.

Die cut means 38 is then employed to cut the photocopy panel and the rear panel along lines 40, 42, 44 and 46 to form eight sub panels or sportscards, 48, 50, 52, 54, 56, 58, 60, and 62 illustrated in FIG. 6. Each sportscard is unique to the individual's image illustrated on the card.

The process is then repeated for as many sportscards as each individual desires. For example, each if each individual orders ten sportscards, the process is then repeated nine times.

Thus, it is to be understood that I have described an economical method for making sportscards of athletes in a low volume technique, having high quality images.

Having described my invention, I claim:

1. A method for making the front side of a card, such as a sportscard and the like, bearing a printed border and bearing a photographed image comprising the steps of making a color photograph of the subject matter of the card;

making a master panel having a front side and a rear side;

printing a border on the master panel around the location of a window area, the window area having an area less than that of the photograph;

cutting the window area in master panel to form a window opening;

locating the color photograph adjacent the rear side of the master panel such that the subject matter of the photograph is visible through the window opening;

connecting the color photograph to the master panel; and photocopying the front of the master panel and that portion of the photograph visible through the window to make a colored photocopy of the master panel and the color photograph.

2. A method for making a plurality of individual cards, such as sportscards, each sportscard having printed indicia material common to all of the plurality of cards, and each bearing the colored photographed image exclusive to the individual card, comprising the steps of:

making a master panel having a front side and a rear side;

printing on the front side of the master panel borders for a plurality of window areas;

cutting the master panel around each window area to form a plurality of window openings;

locating a photograph adjacent the rear side of the master panel behind each window opening such that the subject matter of the photograph is visible through the window opening;

connecting each photograph to the rear side of the master panel;

photocopying the front of the master panel and that portion of each photograph visible through each window to form a photocopied panel; and cutting the photocopied panel into as many sub panels as there are photographed images thereon.

3. A method as defined in claim 2, including the step of forming a back panel with individual indicia material related to each of the sub panels, and attaching the back panel to the rear of the photocopied panel before cutting the photocopied panel and the back panel into as the sub panels.

* * * * *